(12) United States Patent
Yildirim

(10) Patent No.: US 8,894,322 B2
(45) Date of Patent: Nov. 25, 2014

(54) SOIL STABILIZER CONTAINING CARBONACEOUS MATERIAL AND METHODS FOR USING SAME

(75) Inventor: Yetkin Yildirim, Austin, TX (US)

(73) Assignee: Board of Regents of the University of Texas Systems, Austin, TX (US)

(*) Notice: Subject to any disclaimer, the term of this patent is extended or adjusted under 35 U.S.C. 154(b) by 0 days.

(21) Appl. No.: 13/812,632

(22) PCT Filed: Apr. 8, 2011

(86) PCT No.: PCT/US2011/031796
§ 371 (c)(1),
(2), (4) Date: Apr. 8, 2013

(87) PCT Pub. No.: WO2012/018416
PCT Pub. Date: Feb. 9, 2012

(65) Prior Publication Data
US 2013/0195553 A1    Aug. 1, 2013

Related U.S. Application Data

(60) Provisional application No. 61/367,601, filed on Jul. 26, 2010, provisional application No. 61/472,501, filed on Apr. 6, 2011.

(51) Int. Cl.
*E01C 7/36* (2006.01)
*C08K 3/04* (2006.01)
*E02D 3/12* (2006.01)
*E01C 21/00* (2006.01)
*C09K 17/14* (2006.01)
*C09K 17/40* (2006.01)

(52) U.S. Cl.
CPC ... *C08K 3/04* (2013.01); *E02D 3/12* (2013.01); *E01C 21/00* (2013.01); *C09K 17/14* (2013.01); *C09K 17/40* (2013.01); *E01C 7/36* (2013.01)
USPC .......................................................... 404/76

(58) Field of Classification Search
CPC ........... E02D 3/12; C09K 17/40; E01C 21/00; E01C 7/36; C08K 3/04
USPC ............................ 404/17, 27, 31, 75, 76, 111
See application file for complete search history.

(56) References Cited

U.S. PATENT DOCUMENTS 3,520,141 A * 7/1970 Routson ....................... 405/264
3,650,113 A * 3/1972 Ferm ............................ 405/265
3,772,893 A * 11/1973 Eilers .......................... 405/264

(Continued)

FOREIGN PATENT DOCUMENTS

KR    1020060121448    9/1997
KR    1020050043629    5/2007

OTHER PUBLICATIONS

"Standard Guide for Carbon Black-Validation of Test Method Precision and Bias", ASTM International, Oct. 2006, pp. 1-7.

(Continued)

*Primary Examiner* — Raymond W Addie
(74) *Attorney, Agent, or Firm* — Meyertons, Hood, Kivlin, Kowert & Goetzel, P.C.; Eric B. Meyertons

(57) ABSTRACT

A soil stabilizer containing a carbonaceous material is disclosed, together with methods for preparing and using the soil stabilizer.

28 Claims, 3 Drawing Sheets

(56) References Cited

U.S. PATENT DOCUMENTS

| | | | | |
|---|---|---|---|---|
| 3,875,090 A | * | 4/1975 | Levy | 524/269 |
| 3,986,365 A | * | 10/1976 | Hughes | 405/264 |
| 4,367,057 A | * | 1/1983 | Hughes et al. | 405/267 |
| 4,391,926 A | | 7/1983 | Creyf | |
| 4,464,200 A | | 8/1984 | Duval | |
| 4,545,820 A | | 10/1985 | Mallow | |
| 4,669,920 A | * | 6/1987 | Dymond | 405/264 |
| 4,981,398 A | * | 1/1991 | Field et al. | 405/264 |
| 5,021,094 A | * | 6/1991 | Brown et al. | 106/803 |
| 5,462,390 A | * | 10/1995 | Sydansk | 405/264 |
| 5,670,567 A | | 9/1997 | Lahalih | |
| 5,746,546 A | | 5/1998 | Hubbs et al. | |
| 2006/0193700 A1 | * | 8/2006 | Putnam et al. | 405/264 |
| 2010/0189893 A1 | * | 7/2010 | Vitale et al. | 427/206 |

OTHER PUBLICATIONS

"Standard Test Method for Carbon Black-Automated Individual Pellet Hardness", ASTM International, Dec. 2005, pp. 1-3.

"Standard Classification System for Carbon Blacks Used in Rubber Products", ASTM International, Aug. 2006, pp. 1-4.

"Standard Practice for Carbon Black-Sampling Bulk Shipments", ASTM International, Oct. 2006, pp. 1-2.

Office Action from Australian Application No. 2011286419, issued Dec. 19, 2013, pp. 1-3.

International Search Report and Written Opinion from PCT/US2011/031796, mailed Feb. 9, 2012, Board of Regents, The University of Texas System et al, pp. 1-5.

* cited by examiner

SOIL STABILIZER CONTAINING CARBONACEOUS MATERIAL AND METHODS FOR USING SAME

PRIORITY CLAIM

This application is a 371 of PCT Application PCT/US2011/031796, filed Apr. 8, 2011, which claims priority to U.S. Provisional Application Ser. No. 61/367,601, filed Jul. 26, 2010 and U.S. Provisional Application Ser. No. 61/472,501, filed Apr. 6, 2011.

BACKGROUND

1. Technical Field

The present disclosure relates to soil stabilizers, and specifically to soil stabilizers containing a carbonaceous material and methods for using the same.

2. Technical Background

The composition and properties of soils can vary greatly. Such variations can significantly affect the performance of road surfaces constructed thereon. In many instances, soils must be stabilized prior to the construction of a road surface. Conventional stabilization methods can include mechanical methods, such as, for example, compaction and/or mixing fibrous or other reinforcement materials with the soil, and chemical methods, such as, for example, blending binders, water repellents, and/or emulsifiers to the soil to, for example, reduce dusting and modify the behavior of clays within the soil.

Conventional stabilization aids that can be mixed with soils include cements, for example, Portland cement, lime, gypsum, fly ash, and polymers. These conventional stabilization aids can be costly and/or difficult to handle and mix with soils. Thus, there is a need to address the aforementioned problems and other shortcomings associated with conventional soil stabilization aids. These needs and other needs are satisfied by the compositions and methods of the present disclosure.

SUMMARY

In accordance with the purpose(s) of the invention, as embodied and broadly described herein, this disclosure, in one aspect, relates to soil stabilizers, and specifically to soil stabilizers containing a carbonaceous material and methods for using the same.

In one aspect, the present disclosure provides a soil stabilizer comprising a carbonaceous material.

In a second aspect, the present disclosure provides a method for stabilizing soil, the method comprising contacting the soil with carbon black.

BRIEF DESCRIPTION OF THE FIGURES

The accompanying figures, which are incorporated in and constitute a part of this specification, illustrate several aspects and together with the description serve to explain the principles of the invention.

Figure 1:
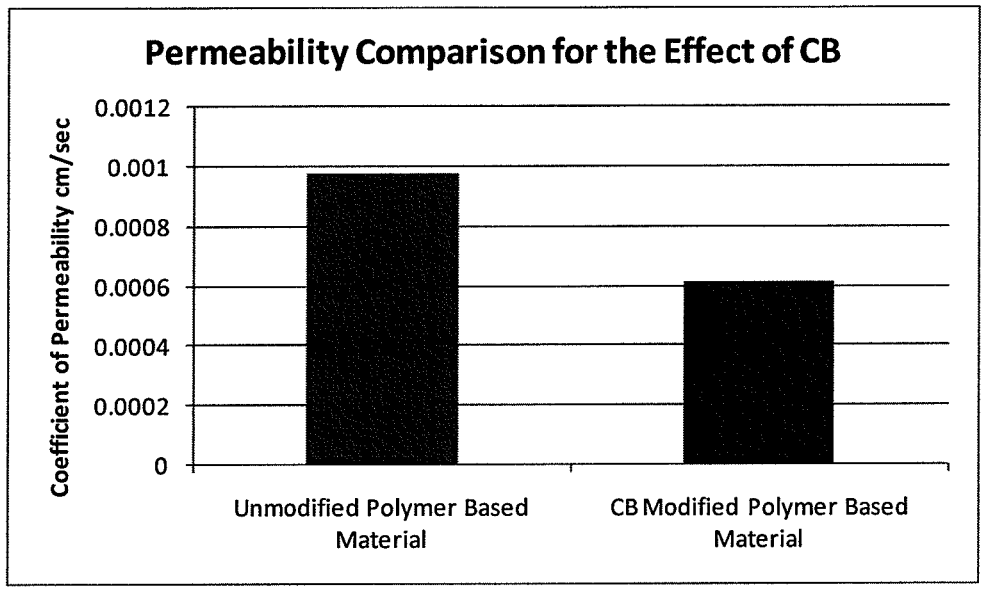
FIG. 1 illustrates the permeability of unmodified materials and carbon modified materials, in accordance with various aspects of the present disclosure.

Additional aspects of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DESCRIPTION

The present invention can be understood more readily by reference to the following detailed description of the invention and the Examples included therein.

Before the present compounds, compositions, articles, systems, devices, and/or methods are disclosed and described, it is to be understood that they are not limited to specific synthetic methods unless otherwise specified, or to particular reagents unless otherwise specified, as such can, of course, vary. It is also to be understood that the terminology used herein is for the purpose of describing particular aspects only and is not intended to be limiting.

Although any methods and materials similar or equivalent to those described herein can be used in the practice or testing of the present invention, example methods and materials are now described.

All publications mentioned herein are incorporated herein by reference to disclose and describe the methods and/or materials in connection with which the publications are cited.

A. DEFINITIONS

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, example methods and materials are now described.

As used in the specification and the appended claims, the singular forms "a," "an" and "the" include plural referents unless the context clearly dictates otherwise. Thus, for example, reference to "a polymer" includes mixtures of two or more polymers.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "optional" or "optionally" means that the subsequently described event or circumstance can or can not occur, and that the description includes instances where said event or circumstance occurs and instances where it does not.

Disclosed are the components to be used to prepare the compositions of the invention as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds can not be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the invention. Thus, if there are a variety of additional steps that can be performed it is understood that each of these additional steps can be performed with any specific embodiment or combination of embodiments of the methods of the invention.

References in the specification and concluding claims to parts by weight, of a particular element or component in a composition or article, denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

"Carbon black" is a conductive acinoform carbon.

"Porosity," or permeability, can be used to refer to porosity of a carbonaceous material, such as carbon black, (i.e., difference in NSA and STSA surface area measurements), or to macroscopic porosity of an electrode structure (i.e., related to ability of diffusion of gaseous reactants through an electrode layer).

"Carbonaceous" refers to a solid material comprised substantially of elemental carbon.

"Carbonaceous material" is intended to include, without limitation, i) carbonaceous compounds having a single definable structure; or ii) aggregates of carbonaceous particles, wherein the aggregate does not necessarily have a unitary, repeating, and/or definable structure or degree of aggregation.

"Particulate" means a material of separate particles.

Each of the materials disclosed herein are either commercially available and/or the methods for the production thereof are known to those of skill in the art.

It is understood that the compositions disclosed herein have certain functions. Disclosed herein are certain structural requirements for performing the disclosed functions, and it is understood that there are a variety of structures that can perform the same function that are related to the disclosed structures, and that these structures will typically achieve the same result.

As briefly described above, the present disclosure provides a soil stabilizer comprising a carbonaceous material and methods for using such stabilizers. In one aspect, the soil stabilizers of the present disclosure can impart increased strength to soils and/or roadbase surfaces as compared to conventional stabilization aids not comprising a carbonaceous material.

The soil stabilizer of the present invention can comprise a carbonaceous material. In one aspect, the soil stabilizer comprises water and a carbonaceous material. In another aspect, the soil stabilizer comprises an aqueous mixture and/or slurry of a carbonaceous material. In yet another aspect, the soil stabilizer comprises a dispersion of a carbonaceous material in water and/or an aqueous medium. In such an aspect, it is not necessary that the carbonaceous material have any specific level of dispersion in the water and/or aqueous medium. In one aspect, all or a portion of the carbonaceous material is at least partially dispersed in the water and/or aqueous medium.

The soil stabilizer can, in various aspects, also comprise a liquid soil sealant, such as, for example, TOP SEAL WHITE® (TSW), available from Soils Control International, Inc. (Temple, Tex., USA). In other aspects, a liquid soil sealant can comprise a dust control agent, a soil erosion preventative, or a combination thereof. In still other aspects, a liquid soil sealant can comprise one or more polymeric materials. In one aspect, a liquid soil sealant, if present, can comprise an elastomer, such as, for example, a water soluble elastomer. In another aspect, a soil sealant can comprise one or more polymeric materials, a vinyl acrylic component, a surfactant, water, and optionally one or more components that can provide hardening properties to the composition. In another aspect, a soil sealant can be a liquid. In yet another aspect, the viscosity of a soil sealant can vary, and the present invention is not intended to be limited to any particular soil sealant. In yet another aspect, a soil sealant can have a pH of from about 3.5 to about 6.5, for example, about 3.5, 3.7, 3.9, 4.1, 4.3, 4.5, 4.7, 4.9, 5.1, 5.3, 5.5, 5.7, 5.9, 6.1, 6.3, or 6.5; or from about 4.5 to about 5.5, for example, about 4.5, 4.6, 4.7, 4.8, 4.9, 5.0, 5.1, 5.2, 5.3, 5.4, or 5.5.

In one aspect, the soil stabilizer of the present invention comprises a carbonaceous material. In another aspect, the carbonaceous material is a particulate carbonaceous material. In another aspect, the carbonaceous material comprises a finely divided particulate carbon. In yet another aspect, the carbonaceous material comprises carbon black. In another aspect, the inventive soil stabilizer comprises a particulate carbon material having a turbostratic structure. In yet another aspect, the inventive soil stabilizer comprises a particulate carbon material produced from a flame process.

In one aspect, the carbonaceous material of the present invention comprises particulate carbon black particles formed from a flame or partial combustion process. In another aspect, carbonaceous material can be produced from a thermal process, for example, without the use of a flame. In yet another aspect, the carbon black is produced from a petroleum feedstock that, for example, has a high degree of aromaticity. In still other aspects, the carbonaceous material can be derived from a pyrolysis process, such as, for example, a pyrolytic char. In other aspects, the carbonaceous material can comprise a recycled and/or recovered carbon, for example, from a tire recycling process. In other aspects, a carbonaceous material can comprise an activated carbon. It should be understood that the carbonaceous material can optionally comprise a mixture of varying types of carbonaceous materials.

In various aspects, the surface of any one or more carbonaceous material can comprise functional groups that can, for example, be hydrophobic or hydrophilic. In one aspect, a carbon black can be produced and/or modified such that the surface chemistry thereof is suitable for blending with a particular soil and/or other optional soil stabilizers. In yet another aspect, a carbonaceous material can be heat treated to remove a portion of or substantially all of the surface functional groups from the surface.

In one example, the carbonaceous material has a hydrophilic surface. In another example, the carbonaceous material has a hydrophobic surface. In yet another aspect, the surface chemistry of a carbonaceous material can be specifically tailored to interact with another species.

In another aspect, the carbonaceous material comprises an aggregate structure wherein multiple primary particles are agglomerated. In such an aspect, the size and/or morphology of any individual aggregates can vary. In one aspect, the carbonaceous material has a large aggregate size and, for example, a high degree of branching. In such an aspect, the carbonaceous material can provide a reinforcing effect to soil particles and/or roadbase surfaces adjacent thereof, and can occlude fluids, such as, for example, hydrocarbons, to increase the viscosity of a mixture of, for example, soil and stabilizing aids. In another aspect, the morphology (e.g., size and degree of branching) of a carbonaceous material can be selected so as to impart one or more desired rheological properties to a soil, a roadbase, or a mixture thereof with a stabilizing aid.

In another aspect, the carbonaceous material can comprise a single grade of carbon black. It should be noted that the properties, such as, for example, particle size, aggregate size, morphology, surface chemistry, and the like, are distributional properties, and that even within a single grade of carbon black variations in properties can occur. In another aspect, the carbonaceous material can comprise a mixture of two or more grades of carbon black.

A carbon black, if present as all or a portion of a carbonaceous material, can comprise any grade or mixture of grades of carbon black. In various aspects, a carbon black can comprise one or more of the following ASTM grades: N110, N220, N330, N550, N700, N880, or N990. In one aspect, a carbon black, if present, can have properties similar to an N700 carbon black. In another aspect, a carbon black, if present, can have a small average primary particle size, for example, less than about 50 nm, less than about 40 nm, or less than about 30 nm.

In another aspect, the carbonaceous material of the present invention can be mixed with one or more other soil modifiers and/or stabilizing aids. In various aspects, a carbonaceous material can be blended with one or more of lime, cement, gypsum, fly ash, combinations thereof, and/or other soil modifiers and/or stabilizing aids. In another aspect, a carbonaceous material can be mixed with a polymeric material, an asphalt emulsion, such as, for example, SS-1h, CSS-1h, an asphalt cutback, such as, for example, MC-30, a non-bituminous product, such as, for example, a non-bituminous prime coat (e.g., EC-30).

In one aspect, the amount of carbonaceous material contacted with and/or blended with a soil can be any amount suitable for providing a desired change in the resulting soil.

Lab results show that, in various aspects, a carbonaceous material, such as, for example, carbon black can reduce permeability and/or water penetration into the pavement structure. In one aspect, the reduction of the water entrance to the road structure can improve durability.

In another aspect, the present invention comprises contacting a stabilizer, such as, for example, a carbon black containing soil stabilizer, with a portion of soil, for example in a roadbase. In various aspects, the stabilizer can be applied to an otherwise unamended, a soil or mixture of soil and other materials to be used as a road surface, a roadbase, or a combination thereof. The degree of mixing and/or uniformity of the resulting soil can vary, and no specific amount of mixing or level of homogeneity is required. In one aspect, a portion of a carbonaceous material or a stabilizer containing a carbonaceous material can be contacted with a soil. In another aspect, a stabilizer can be sprayed onto a soil or roadbase. In another aspect, a portion of a carbonaceous material or a stabilizer containing a carbonaceous material, such as carbon black, can be mixed and/or blended with a soil or mixture of materials that form a roadbase. In yet another aspect, a portion of a carbonaceous material or a stabilizer containing a carbonaceous material can be mixed and/or blended with a soil and/or roadbase such that the carbonaceous material is uniformly or substantially uniformly distributed throughout the material. In yet another aspect, a portion of a carbonaceous material or a stabilizer containing a carbonaceous material can be mixed and/or blended with a soil or mixture of materials such that the carbonaceous material is not uniformly or substantially uniformly distributed throughout the same.

Carbon black materials are commercially available (e.g., Columbian Chemicals Company, Marietta, Ga., USA; Cabot Corporation, Billerica, Mass., USA), and one of skill in the art in possession of this disclosure could readily select an appropriate carbon black material.

The carbonaceous material, water, and optional soil sealant can each be present in any suitable concentration. In various aspects, the stabilizer can comprise from about 0.5 parts to about 1.5 parts by weight, for example, about 0.5, 0.6, 0.7, 0.8, 0.9, 1, 1.1, 1.2, 1.3, 1.4, or 1.5 parts by weight of carbonaceous material; from about 0.5 parts to about 1.5 parts by weight, for example, about 0.5, 0.6, 0.7, 0.8, 0.9, 1, 1.1, 1.2, 1.3, 1.4, or 1.5 parts by weight of water; and from about 2 parts to about 4 parts by weight, for example, about 2, 2.2, 2.4, 2.6, 2.8, 3, 3.2, 3.5, 3.6, 3.8, or 4 parts by weight of a soil sealant. In one aspect, the stabilizer comprises about 1 part by weight carbonaceous material, about 1 part by weight water, and about 3 parts by weight of a soil sealant. In other aspects, the concentrations of any one or more components can vary, and the present invention is not intended to be limited to any particular concentration or range of concentrations. Thus, in another aspect, a stabilizer can comprise less than about 0.5 parts by weight or greater than about 1.5 parts by weight of carbonaceous material, less than about 0.5 parts by weight or greater than about 1.5 parts by weight of water, and/or less than about 2 parts by weight or greater than about 4 parts by weight of a soil sealant. In one aspect, the stabilizer can be prepared, stored, and/or transported in a ready to use concentration. In another aspect, the stabilizer can be prepared in a concentrated form and can be diluted, for example, with water, prior to use. In another aspect, the concentrations recited above can provide a composition suitable for use as-is. In yet another aspect, a concentrated soil stabilizer composition having the concentrations of components recited above can be diluted with water in a ratio of from about 1:1 to about 1:10 (parts by weight of concentrate:diluent water), for example, about 1:1, 1:2, 1:3, 1:4, 1:5, 1:6, 1:7, 1:8, 1:9, or 1:10, prior to use. In a specific example, a concentrated soil stabilizer comprises can be prepared and then diluted about 1:5 with water before use.

In other aspects, one or more conventional stabilization aids, such as, for example, Portland cement, lime, gypsum, fly ash, polymeric materials, asphalt emulsions, asphalt cutbacks, and combinations thereof, can be added to a soil stabilizer composition. If added, a conventional stabilization aid can be present in any suitable concentration, such as, for example, from about 0.1 parts by weight to about 10 parts by weight, or more.

The components of a soil stabilizer, such as, for example, a carbonaceous material, water, and a soil sealant can be contacted and/or mixed in any manner suitable for an intended application. In one aspect, no specific order of addition and/or degree of mixing is required. In another aspect, the components can be contacted and mixed prior to use such that the stabilizer composition is homogeneous or substantially homogeneous. In another aspect, at least a portion of the carbonaceous material and at least a portion of the soil sealant can be contacted prior to the addition of water and/or any other components. In still another aspect, the carbonaceous material and soil sealant can be contacted prior to the addition of water. Once at least two of the components are contacted, the mixture can optionally be mixed using any conventional means, such as, for example, a slow rotational mixer in a blending tank. In one aspect, a mixer element and/or means for mixing can move through at least a portion of the mixture, for example, in a continuous up and down manner, until the mixture is at least partially blended. It should be appreciated that particular carbonaceous materials can be difficult to disperse and that the use of such carbonaceous materials can, in some aspects, require the use of energetic mixing methods, such as, for example, high shear mixers. In other aspects, no specific degree of mixing and/or dispersion is required.

A soil stabilizer composition can, in one aspect, have a solids content of from about 45% to about 55%, for example, about 45, 46, 47, 48, 49, 50, 51, 52, 53, 54, or 55%. In a specific aspect, a soil stabilizer has a solids content of about 50%. In still other aspects, a soil stabilizer can have a solids content of less than about 45% or greater than about 55%, and the present invention is not intended to be limited to any particular solids content. A soil stabilizer can also have a viscosity of from about 250 cP to about 350 cP, for example, about 250, 260, 270, 280, 290, 300, 310, 320, 330, 340, or 350 cP. In a specific aspect, a soil stabilizer has a viscosity of about 300 cP. In still other aspects, a soil stabilizer can have a viscosity of less than about 250 cP or greater than about 350 cP, and the present invention is not intended to be limited to any particular viscosity.

Application of Stabilizer

In one aspect, a soil stabilizer composition, as described herein, can be applied to any soil or roadbase surface. In one aspect, a soil or roadbase surface can be scarified prior to application of a soil stabilizer. In another aspect, a surface should be at least partially stabilized and compacted prior to application of the soil stabilizer. In yet another aspect, a surface should be stabilized and well compacted prior to application of the soil stabilizer. In another aspect, the concentration of a soil stabilizer can vary depending on, for example, the type of surface and degree of compaction thereof. For example, a soil stabilizer can be diluted with a greater amount of water when applied to a well compacted soil and/or roadbase surface, so as to facilitate greater penetration of the soil stabilizer into the soil and/or roadbase. In contrast, a soil stabilizer can be applied in a more concentrated (or less diluted) form when applied to a less compacted and/or granular soil or roadbase surface. Such a soil or roadbase surface can, in some aspects, be more difficult to compact, and are thus more suitable for a higher concentration of soil stabilizer. In yet another aspect, a soil stabilizer can be applied to an uncompacted or partially compacted soil or roadbase surface, and then the soil or roadbase surface can optionally be compacted after the application. One of skill in the art, in possession of this disclosure, could readily determine an appropriate concentration and/or dilution level for use with a particular soil and/or roadbase surface.

In another aspect, a soil stabilizer can be utilized as an additive in a surface coating, such as, for example, a chip seal and/or asphalt coating. In such an aspect, the soil stabilizer can provide extended wear of the surface to which the coating is applied and/or an improved appearance for the coated surface.

A soil stabilizer can be applied to a soil or roadbase surface in any suitable manner. In one aspect, a soil stabilizer can be sprayed, for example, from a water truck using a pressurized spray system. In such an aspect, the pressure and application rate should be such that the spray pattern provides an even or substantially even distribution of soil stabilizer on the soil or roadbase surface. In another aspect, the soil stabilizer can be applied in a seamless manner, such that only a small overlap, if at all, exists between portions of the treated (e.g., sprayed) soil or roadbase surface. In still other aspects, the soil stabilizer can be sprayed using other methods, for example, a hose, wand, or non-pressurized system. In still other aspects, a non-spraying method, can be utilized.

The soil stabilizer can be applied as a single layer application or as multiple layers. In one aspect, a single application of the soil stabilizer can be made to provide a single layer on the soil and/or roadbase surface. In another aspect, multiple applications of the soil stabilizer can be made, wherein each layer can be in contact with the previous layer of applied soil stabilizer or in contact with a different layer. For example, multiple layers of varying composition, one or more of which are the inventive soil stabilizer, can be applied to a soil or roadbase surface. In such an aspect, it is not necessary that any one or more layers comprise a continuous layer across the soil or roadbase surface. In an exemplary aspect, one or more applications of a soil sealant can be applied to a soil or roadbase as a first layer, followed by one or more applications of the inventive soil stabilizer, followed by an additional one or more applications of a soil sealant of the same or differing composition. In a specific example, two applications of a soil sealant, such as Top-Seal White, can be applied to a soil or roadbase surface, followed by two applications of the inventive soil stabilizer, followed by a final application of the Top-Seal White soil sealant.

In other aspects, the stabilizer can be applied as a fog coat, for example, as a sprayed slurry, onto a road surface or base therefore. In such an aspect, an applied fog coat layer comprising the stabilizer can reduce permeability of the surface to which the fog coat is applied. In another aspect, such a fog coat can at least partially seal one or more cracks in the surface to which the fog coat is applied. A fog coat comprising the stabilizer, if used, can optionally comprise other components as desired for the intended application.

In another aspect, the stabilizer can be used in a tack coat application. In such an aspect, the stabilizer can provide a traceless tack coat. In another aspect, the stabilizer can improve adhesion between any two or more layers of pavement or road material. In yet another aspect, the stabilizer can reduce the permeability between any two or more layers of pavement or road material. In one aspect, if the soil stabilizer is applied as a fog coat and/or a tack coat application, the soil or roadbase surface to which it is applied should be free or substantially free from dust prior to application. In another aspect, the soil stabilizer can be applied to a soil or roadbase surface as-is, without further preparation or cleaning of the surface.

Properties of Treated Surface

In one aspect, contacting and/or mixing a carbonaceous material and/or a stabilizer containing a carbonaceous material can improve one or more properties of a roadbase surface, such as, for example, increasing strength, reducing permeability, reducing the amount of compaction necessary to form a suitable road surface, and increasing the surface smoothness of a road surface.

In one aspect, after application of a soil stabilizer to a soil or roadbase surface, at least a portion of the stabilizer can be bound to the soil or roadbase surface. In such an aspect, the soil stabilizer can help form a hardened wear surface, for example, after drying. In another aspect, the soil stabilizer can be tightly bound to the soil or roadbase surface after application. In another aspect, the soil stabilizer can have adhesive properties that can ensure that the soil stabilizer will remain bound to the soil or roadbase surface and provide an at least partial barrier to moisture penetration.

In another aspect, contacting and/or mixing a stabilizer containing a carbonaceous material with a soil can reduce the permeability of the resulting soil to, for example, water. In various exemplary aspects, the use of a stabilizer containing a carbonaceous material, such as, carbon black, can reduce the coefficient of permeability (cm/sec) by up to about 35% or more, for example, at least about 20%, at least about 25%, at least about 30%, at least about 35%, at least about 37% or more, as compared to a similar stabilizer not containing the carbonaceous material. In a specific aspect, use of a stabilizer comprising a carbon black can reduce the coefficient of permeability by about 37.1% as compared to an unmodified material not comprising a carbon black. FIG. 1 illustrates an exemplary reduction in permeability of from 0.000978 cm/sec to 0.000615 cm/sec when using a carbon black containing stabilizer, as compared to an unmodified polymeric material, such as a soil sealant.

Figure 2:
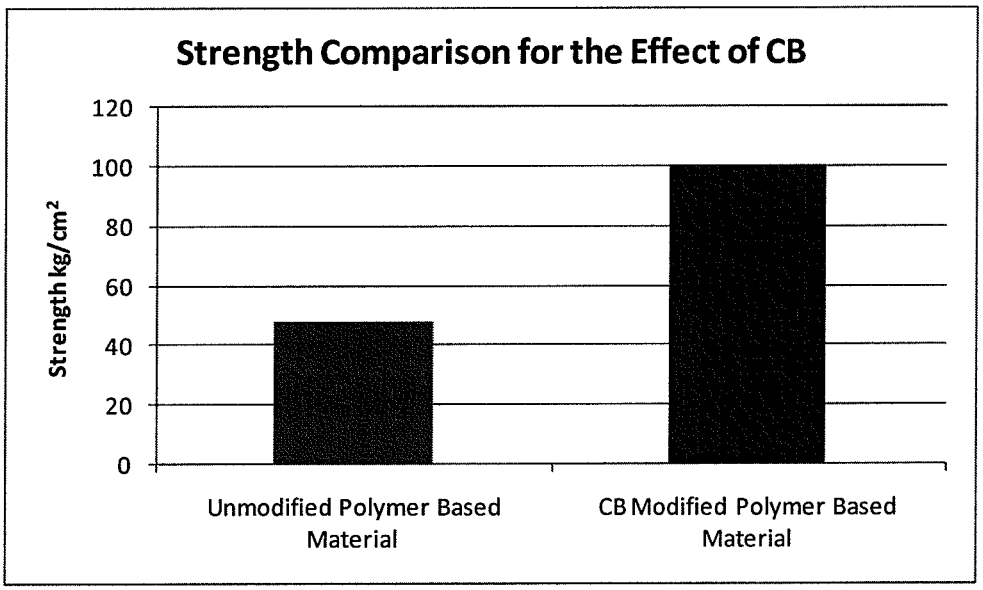
FIG. 2 illustrates the strength of unmodified materials and carbon modified materials, in accordance with various aspects of the present disclosure.

In one aspect, contacting and/or mixing a stabilizer containing a carbonaceous material with a soil can increase the strength of the resulting soil. In one aspect, the stabilizer can improve the wet strength of a resulting soil. In another aspect, the stabilizer can improve the dry strength of a resulting soil. In another aspect, the stabilizer can improve both the wet strength and the dry strength of a resulting soil. In various aspects, the strength (kg/cm$^2$) of a soil stabilized with a carbonaceous material containing stabilizer can increase by up to about 100% or more, for example, about 50%, about 60%, about 70%, about 80%, about 90%, about 100%, about 105%, or more over soil stabilized with an unmodified stabilizer not containing a carbonaceous material. In a specific aspect, as illustrated in FIG. 2, a stabilizer comprising carbon black can increase the strength of a soil by about 107.9%, for example, from 48.17 kg/cm$^2$ to 100.14 kg/cm$^2$) as compared to an unmodified stabilizer not containing carbon black. In various aspects, wet and/or dry strength of a soil or roadbase surface can be determined using a penetrometer, such as, for example, a pocket penetrometer, available from Durham Geo Slope Indicator, Mulkiteo, Wash., USA. In another aspect, the soil strength can be determined using ASTM test method WK27337.

In yet another aspect, contacting and/or mixing a stabilizer containing a carbonaceous material with a soil can provide a resulting soil that can require less effort to achieve a desired degree of compaction. In yet other aspects, contacting and/or mixing a stabilizer containing a carbonaceous material with a soil can provide a road surface having increased surface smoothness. In still other aspects, contacting and/or mixing a stabilizer containing a carbonaceous material with a soil can provide a road surface having a gray and/or black color.

In one aspect, soil contacted and/or mixed with a carbonaceous material, such as carbon black, can exhibit improved workability as compared to unamended soils or soils containing conventional stabilizers.

In another aspect, soil contacted and/or mixed with a stabilizer containing a carbonaceous material can provide a road surface having improved functional properties as compared to an unamended soil or a soil containing conventional stabilizers.

In yet another aspect, a pavement formed on a soil contacted and/or mixed with a stabilizer containing a carbonaceous material can exhibit reduced long-term maintenance costs and/or improved performance over unamended soils or soils containing conventional stabilizers.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary of the invention and are not intended to limit the scope of what the inventors regard as their invention. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

In a first example, a test section was constructed to evaluate the effectiveness of application of soil stabilizer and carbon black on soil. Mixing ratios of carbon black and the soil stabilizer were determined based on lab design work. Using this design, first the soil stabilizer and carbon black were mixed at a 3 to 1 ratio respectively. After mixing is completed, this new mixture was combined with water at a 4 to 1 ratio respectively to elongate its shelf life. This new mixture is shipped to the test section where it is mixed with water at a 1 to 5 ratio respectively before application on the road surface. After the application of this material on the road surface, compaction is applied to the road.

Figure 3:
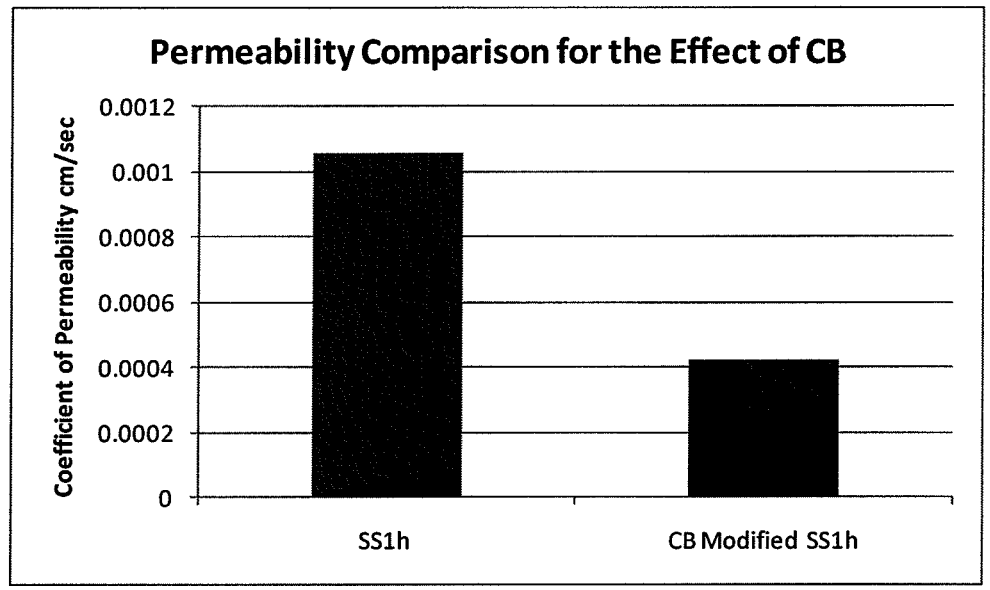
FIG. 3 illustrates the permeability of unmodified materials and materials modified with about 6.5 wt. % carbon black, in accordance with various aspects of the present disclosure.

In a second example, an unmodified asphalt emulsion (SS1h) not comprising an added carbonaceous material was applied to a soil. In comparison, a modified SS1h asphalt emulsion comprising about 6.5 wt. % carbon black was added to a separate portion of the soil. The unmodified emulsion exhibited a Saybolt viscosity at 77° F. of about 55 SSU (Saybolt seconds Universal), a specific gravity of about 1.019 at 60° F., as determined by gallon weight cup, a distillation residue of about 66.03%, having an oil portion of about 0.45% and a penetration residue at 77° F. of about 95 p.u. The permeability of each of the resulting soils was measured. As illustrated in FIG. 3, the permeability of the soil treated with inventive carbon black modified soil stabilizer was significantly reduced, from greater than about 0.001 cm/sec to about 0.0004 cm/sec.

Figure 4:
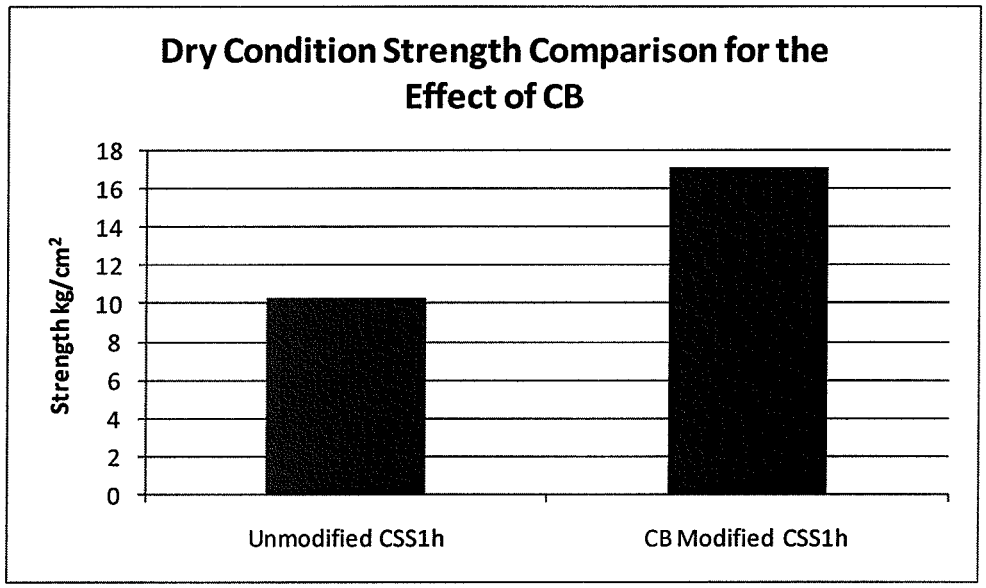
FIG. 4 illustrates the dry strength of unmodified materials and materials modified with about 13 wt. % carbon black, in accordance with various aspects of the present disclosure.

In a third example, an unmodified asphalt emulsion (CSS1h) not comprising an added carbonaceous material was applied to a soil. In comparison, a modified CSS1h asphalt emulsion comprising about 13 wt. % carbon black was added to a separate portion of the soil. The unmodified emulsion exhibited a Saybolt viscosity at 77° F. of about 25 SSU (Saybolt seconds Universal), a specific gravity of about 1.0416 at 60° F., as determined by gallon weight cup, a distillation residue of about 61.69%, having no detectable oil portion and a penetration residue at 77° F. of about 82 p.u. The dry condition strength of each of the resulting soils was measured. As illustrated in FIG. 4, the dry strength of the soil treated with inventive carbon black modified soil stabilizer was significantly increased, from about 10 kg/cm$^2$ to about 17 kg/cm$^2$.

Figure 5:
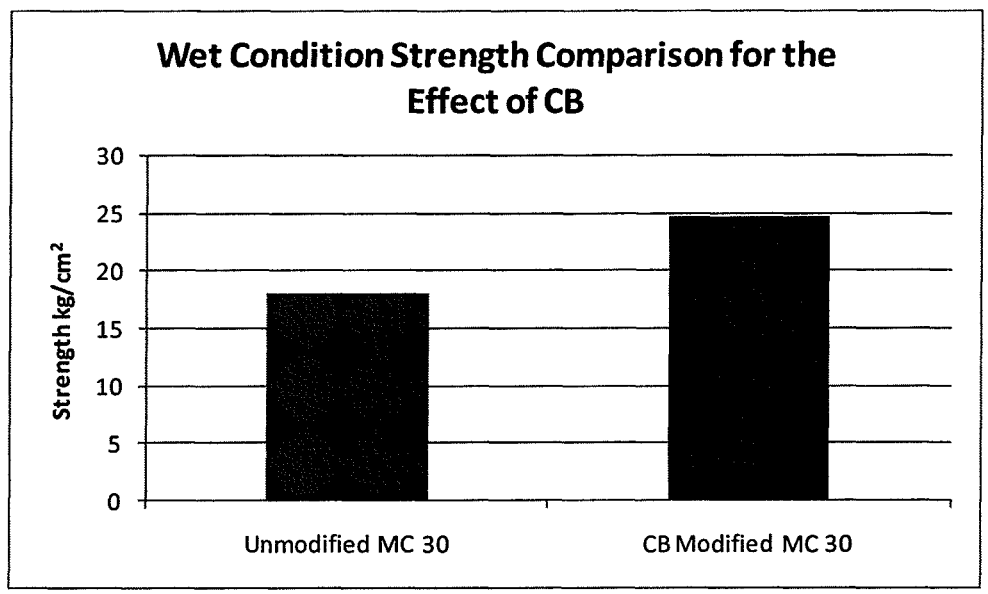
FIG. 5 illustrates the wet strength of unmodified materials and materials modified with about 8 wt. % carbon black, in accordance with various aspects of the present disclosure.

In a fourth example, an unmodified asphalt cutback (MC 30) not comprising an added carbonaceous material was applied to a soil. In comparison, a modified MC 30 asphalt cutback comprising about 8 wt. % carbon black was added to a separate portion of the soil. The unmodified asphalt cutback exhibited a kinematic viscosity at 140° F. of about 51.13 cSt, a specific gravity of about 0.9265 at 60° F., as determined by hydrometer, a distillation residue of about 56.95% by volume, having portions of distillate to 437° F., 500° F., and 600° F., of 21.18%, 58.82%, and 88.24%, respectively, a penetration residue at 77° F. of about 186 p.u., and an absolute viscosity at 140° F. of about 661.93 P. The wet condition strength of each of the resulting soils was measured. As illustrated in FIG. 5, the wet strength of the soil treated with inventive carbon black modified soil stabilizer was significantly increased, from about 18 kg/cm$^2$ to greater than about 24 kg/cm$^2$.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A soil stabilizer comprising:
    a carbonaceous material, wherein the carbonaceous material comprises pyrolytic char; and
    at least one soil sealant, wherein at least one soil sealant comprises one or more polymeric materials, and wherein the polymeric material comprises one or more acrylic compounds;
    wherein the carbonaceous material substantially modifies the soil sealant such that at least one physical property of the soil stabilizer is changed relative to soil stabilizer containing unmodified soil sealant.

2. The soil stabilizer of claim 1, further comprising water.

3. The soil stabilizer of claim 2, wherein at least one of the soil sealants comprises vinyl acrylic polymer.

4. The composition of claim 1, wherein the soil stabilizer, when mixed with the soil, reduces the coefficient of permeability of the soil by at least 20% as compared to a soil stabilized with a soil stabilizer with substantially small amounts of, or without, carbonaceous material.

5. The soil stabilizer of claim 2, wherein the soil stabilizer comprises about 1 part by weight of the carbonaceous material, about 1 part by weight water, and about 3 parts by weight of a soil sealant.

6. The soil stabilizer of claim 1, wherein the soil stabilizer is an aqueous slurry.

7. The soil stabilizer of claim 1, wherein the carbonaceous material comprises particulates.

8. The soil stabilizer of claim 1, wherein the carbonaceous material comprises carbon black.

9. The composition of claim 1, wherein the soil stabilizer, when mixed with the soil, increases the strength of the soil by about 50% as compared to soil stabilized with a soil stabilizer with substantially small amounts of, or without, carbonaceous material.

10. The soil stabilizer of claim 1, further comprising at least one of fly ash, cement, lime, gypsum, polymer or a combination thereof.

11. The soil stabilizer of claim 1, further comprising an asphalt emulsion, an asphalt cutback, a non-bituminous prime coat product, or a combination thereof.

12. The soil stabilizer of claim 1, wherein the soil stabilizer is capable of increasing the dry strength of a soil and/or roadbase upon contact therewith.

13. The soil stabilizer of claim 1, wherein the soil stabilizer is capable of increasing the wet strength of a soil and/or roadbase upon contact therewith.

14. The soil stabilizer of claim 13, wherein the wet strength is increased by at least about 50%.

15. The soil stabilizer of claim 1, wherein the soil stabilizer is capable of reducing the permeability to water of a soil and/or roadbase upon contact therewith.

16. The soil stabilizer of claim 15, wherein the permeability is reduced by at least about 20%.

17. The soil stabilizer of claim 1, wherein the soil stabilizer is capable of increasing the workability of a soil and/or roadbase upon contact therewith.

18. The soil stabilizer of claim 1, wherein upon contacting with a soil and/or roadbase, the smoothness of a road surface formed thereon is improved.

19. A method of stabilizing a soil and/or a roadbase, the method comprising:
    contacting the soil and/or roadbase with a soil stabilizer, the soil stabilizer comprising:
    a carbonaceous material, wherein the carbonaceous material comprises pyrolytic char; and
    at least one soil sealant, wherein the soil sealant comprises one or more polymeric materials, wherein the polymeric material comprises one or more acrylic compounds; wherein the carbonaceous material substantially modifies the soil sealant such that at
    least one physical property of the soil stabilizer is changed relative to soil stabilizer containing unmodified soil sealant.

20. The method of claim 19, wherein contacting comprises spraying.

21. The method of claim 19, wherein the soil stabilizer forms a fog coat on the soil and/or roadbase.

22. The method of claim 19, wherein contacting comprises blending and/or mixing the soil stabilizer with the soil and/or roadbase.

23. The method of claim 19, wherein after contacting, the carbonaceous material is distributed uniformly or substantially uniformly throughout the soil and/or roadbase.

24. The method of claim 19, wherein at least one of the following is achieved:
    increased soil strength, reduced soil permeability, or increased soil workability.

25. The method of claim 24, wherein the increased soil strength, reduced soil permeability, and/or increased soil workability, is due to a presence of carbon black, soil stabilizer containing carbon black, or a combination thereof.

26. A soil and/or roadbase comprising:
    at least a partial layer of a soil stabilizer, the soil stabilizer comprising:
    a carbonaceous material, wherein the carbonaceous material comprises pyrolytic char; and at least one soil sealant, wherein at least one soil sealant comprises one or more polymeric materials, and wherein the polymeric material comprises one or more acrylic compounds;

wherein the carbonaceous material substantially modifies the soil sealant such at least one physical property of the soil stabilizer is changed relative to soil stabilizer containing unmodified soil sealant.

27. The soil and/or roadbase of claim 26, wherein the layer is continuous across at least a portion of the soil and/or roadbase.

28. A fog coat comprising:
a soil stabilizer, the soil stabilizer comprising:
a carbonaceous material, wherein carbonaceous materials comprise pyrolytic char; and
at least one soil sealant, wherein at least one soil sealant comprises one or more polymeric materials, and wherein the polymeric material comprises one or more acrylic compounds;
wherein the carbonaceous material substantially modifies the soil sealant such that at least one physical property of the soil stabilizer is changed relative to soil stabilizer containing unmodified soil sealant.

* * * * *